United States Patent
Dahlen et al.

(10) Patent No.: US 9,785,471 B1
(45) Date of Patent: Oct. 10, 2017

(54) EXECUTION OF SERIALIZED WORK DATA WITH INTERLOCKED FULL AREA INSTRUCTIONS

(71) Applicant: INTERNATIONAL BUSINESS MACHINES CORPORATION, Armonk, NY (US)

(72) Inventors: Dennis J. Dahlen, Rhinebeck, NY (US); Peter D. Driever, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/276,996

(22) Filed: Sep. 27, 2016

(51) Int. Cl.
*G06F 9/46* (2006.01)
*G06F 9/50* (2006.01)
*G06F 9/30* (2006.01)

(52) U.S. Cl.
CPC .......... *G06F 9/5022* (2013.01); *G06F 9/3005* (2013.01); *G06F 9/30087* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 6,128,710 A | 10/2000 | Greenspan et al. | |
| 7,810,094 B1 * | 10/2010 | McClure | G06F 9/4881 718/100 |
| 2006/0010451 A1 * | 1/2006 | Lenk | G06F 9/52 718/105 |
| 2011/0320780 A1 | 12/2011 | Dyck | |
| 2012/0066467 A1 * | 3/2012 | Mealey | G06F 9/526 711/164 |
| 2014/0237145 A1 * | 8/2014 | Mints | G06F 5/12 710/53 |
| 2015/0261790 A1 | 9/2015 | Helsley et al. | |

FOREIGN PATENT DOCUMENTS

WO   0046672 A1   8/2000

OTHER PUBLICATIONS

Rogers, et al., IBM Technical Support Organization, z/OS Version 1 Release 12 Implementation, ibm.com/redbooks, Apr. 2011, pp. 1-888.

* cited by examiner

*Primary Examiner* — Tammy Lee
(74) *Attorney, Agent, or Firm* — Cantor Colburn LLP; Steven Chiu (57) ABSTRACT

A computer-implemented method for operating multiple processors is described. The method includes receiving, by a processor operatively connected to a data channel, work task data that includes execution instructions, and storing, with the processor, the work task data to an operatively connected memory storage area. The method further includes updating a sequential work buffer indicative of whether the work task data is a highest current value in a plurality of sequential execution values, performing a compare double swap (CDS) lock attempt, and executing, with the processor, the work task data responsive to a successful lock attempt.

14 Claims, 4 Drawing Sheets

FIG. 1: Exemplary Computer

EXECUTION OF SERIALIZED WORK DATA WITH INTERLOCKED FULL AREA INSTRUCTIONS

BACKGROUND

The present disclosure relates to processor management, and more specifically, to serial execution of instructions from non-serialized work sources with interlocked full area instructions.

Systems with multiple processors receive various work tasks that arrive each over multiple channels. Multiple processors are available to perform work, and each processor can be generating work that needs to be serialized. Each work task has a sequence number associated with it that is indicative of the relative order of its execution. The work tasks may not arrive in order at the processors, yet they must be processed in proper order. When work arrives, each processor is aware of the relative order, which is stated in a predetermined field containing a sequence number of the highest instruction (work task) value to be executed. Any particular work task cannot be executed until all preceding work task numbers are sequentially executed. If there is any delay in a previous work task, that delays all subsequent execution of the following work tasks. Consequently, since only one processor can be doing the serialized work at any particular time, no work can be missed or else a system stall may occur.

SUMMARY

According to an embodiment of the present invention, a computer-implemented method for operating multiple processors is described. The method may include receiving, via a processor operatively connected to a data channel, work task data that includes execution instructions, and storing, via the processor, the work task data to an operatively connected memory storage area. The method further includes updating a sequential work buffer indicative of whether the work task data is a highest current value in a plurality of sequential execution values, performing a compare double swap (CDS) lock attempt, and executing, via the processor, the work task data responsive to a successful lock attempt.

According to other embodiments, a system for operating multiple processors is described. The system may include a processor of a plurality of processors connected to a plurality of data channels, the processor configured to receive work task data that include execution instructions, and store the work task data to an operatively connected memory storage area. The system is also configured to update a sequential work buffer indicative of whether the work task data is a highest current value in a plurality of sequential execution values, perform a compare double swap (CDS) lock attempt, and execute the work task data responsive to a successful lock attempt.

According to yet other embodiments, a non-transitory computer-readable storage medium is described. The non-transitory storage medium may include program instructions that are executable by a processor to perform a method for operating multiple processors. The method includes receiving work task data that include execution instructions, and storing, via the processor, the work task data to an operatively connected memory storage area. The method further includes updating a sequential work buffer indicative of whether the work task data is a highest current value in a plurality of sequential execution values, performing a compare double swap (CDS) lock attempt, and executing, via the processor, the work task data responsive to a successful lock attempt.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
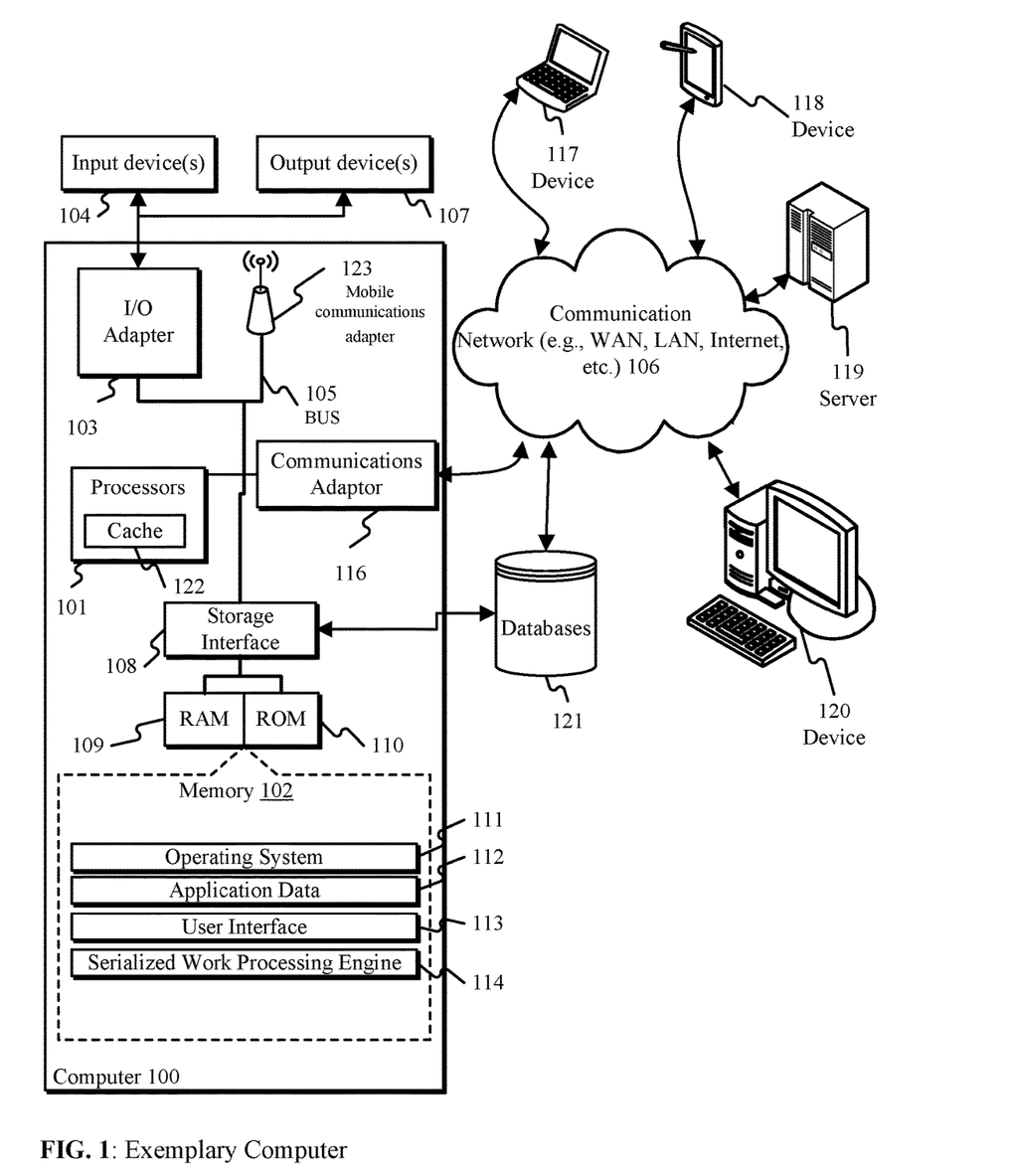
FIG. 1 depicts a block diagram of a computer system for use in practicing the teachings herein.

FIG. 1 illustrates a block diagram of an exemplary computing environment and computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a tablet computer, etc.

In an exemplary embodiment, in terms of hardware architecture, as shown in FIG. 1, the computer 100 includes processor 101. Computer 100 also includes memory 102 coupled to processor 101, and one or more input/output adapters 103 that may be communicatively coupled via system bus 105. Memory 102 may be operatively coupled to one or more internal or external memory devices via a storage interface 108. Communications adapter 116 may operatively connect computer 100 to one or more networks 106. System bus 105 may connect one or more user interfaces via input/output (I/O) adapter 103. I/O adapter 103 may connect a plurality of input devices 104 to computer 100. Input devices may include, for example, a keyboard, a mouse, a microphone, a sensor, etc. System bus 105 may also connect one or more output devices 107 via I/O adapter 103. Output device 107 may include, for example, a display, a speaker, a touchscreen, etc.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a cache memory 122, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 122 may be organized as a hierarchy of more cache levels (L1, L2, etc.).

Processor 101 may be disposed in communication with one or more memory devices (e.g., RAM 109, ROM 110, one or more external databases 121, etc.) via a storage interface 108. Storage interface 108 may also connect to one or more memory devices including, without limitation, one or more databases 121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc.

Memory 102 can include random access memory (RAM) 109 and read only memory (ROM) 110. RAM 109 can be any one or combination of volatile memory elements (e.g., DRAM, SRAM, SDRAM, etc.). ROM 110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Memory 102 may also be a distributed architecture, where various components are situated remote from one another, but can be accessed by processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

The instructions in memory 102 may further include application data 112, and a user interface 113.

Memory 102 may also include a serialized work processing engine 114, configured to provides for a single interlocked operation to both free a memory lock, which ensures serial execution and ensure that there is no additional work added at the instant the lock is freed, and thus, ensuring that work is serialized and no work element is missed by the executing processor.

I/O adapter 103 can be, for example, but not limited to, one or more buses or other wired or wireless connections. I/O adapter 103 may have additional elements (which are omitted for simplicity) such as controllers, microprocessors, buffers (caches), drivers, repeaters, and receivers, which may work in concert to enable communications. Further, I/O adapter 103 may facilitate address, control, and/or data connections to enable appropriate communications among the aforementioned components.

I/O adapter 103 can further include a display adapter coupled to one or more displays. I/O adapter 103 may be configured to operatively connect one or more input/output (I/O) devices 107 to computer 100. For example, I/O 103 may connect a keyboard and mouse, a touchscreen, a speaker, a haptic output device, or other output device. Output devices 107 may include but are not limited to a printer, a scanner, and/or the like. Other output devices may also be included, although not shown. Finally, the I/O devices connectable to I/O adapter 103 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 100 may include a mobile communications adapter 123. Mobile communications adapter 123 may include GPS, cellular, mobile, and/or other communications protocols for wireless communication.

In some embodiments, computer 100 can further include a communications adapter 116 for coupling to a network 106.

Network 106 can be an IP-based network for communication between computer 100 and any external device. Network 106 transmits and receives data between computer 100 and devices and/or systems external to computer 100. In an exemplary embodiment, network 106 can be a managed IP network administered by a service provider. Network 106 may be a network internal to an aircraft, such as, for example, an avionics network, etc. Network 106 may be implemented in a wireless fashion, e.g., using wireless protocols and technologies, such as WiFi, WiMax, etc. Network 106 may also be a wired network, e.g., an Ethernet network, an ARINC 429 network, a controller area network (CAN), etc., having any wired connectivity including, e.g., an RS232 connection, R5422 connection, etc. Network 106 can also be a packet-switched network such as a local area network, wide area network, metropolitan area network, Internet network, or other similar type of network environment. The network 106 may be a fixed wireless network, a wireless local area network (LAN), a wireless wide area network (WAN) a personal area network (PAN), a virtual private network (VPN), intranet or other suitable network system.

Network 106 may operatively connect computer 100 to one or more devices including device 117, device 118, and device 120. Network 106 may also connect computer 100 to one or more servers such as, for example, server 119.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 110 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Now by way of a general overview, additional background for the presently claimed embodiments will be provided. In computing systems having multiple core processors, all of the processors may be configured to be the executing processor, but only one of the processors can be the active executing processor at any given time. When one processor is executing, the non-executing processors can bring in the work that needs to be executed through connected data channels, and set up the received tasks for serial execution by the executing processor. Work may arrive at the processors out of order, but must be completed (executed) in order. In order to execute the various processed tasks efficiently in sequential order, it may be beneficial to implement a combined compare and swap operation with a swap and compare double swap operation.

Embodiments described herein provide for a single interlocked operation to both free the memory lock which ensures serial execution. This interlocked operation ensures that there has been no additional work added at the instant the lock is freed, ensures that work is serialized, and that no work element was missed.

Figure 2:
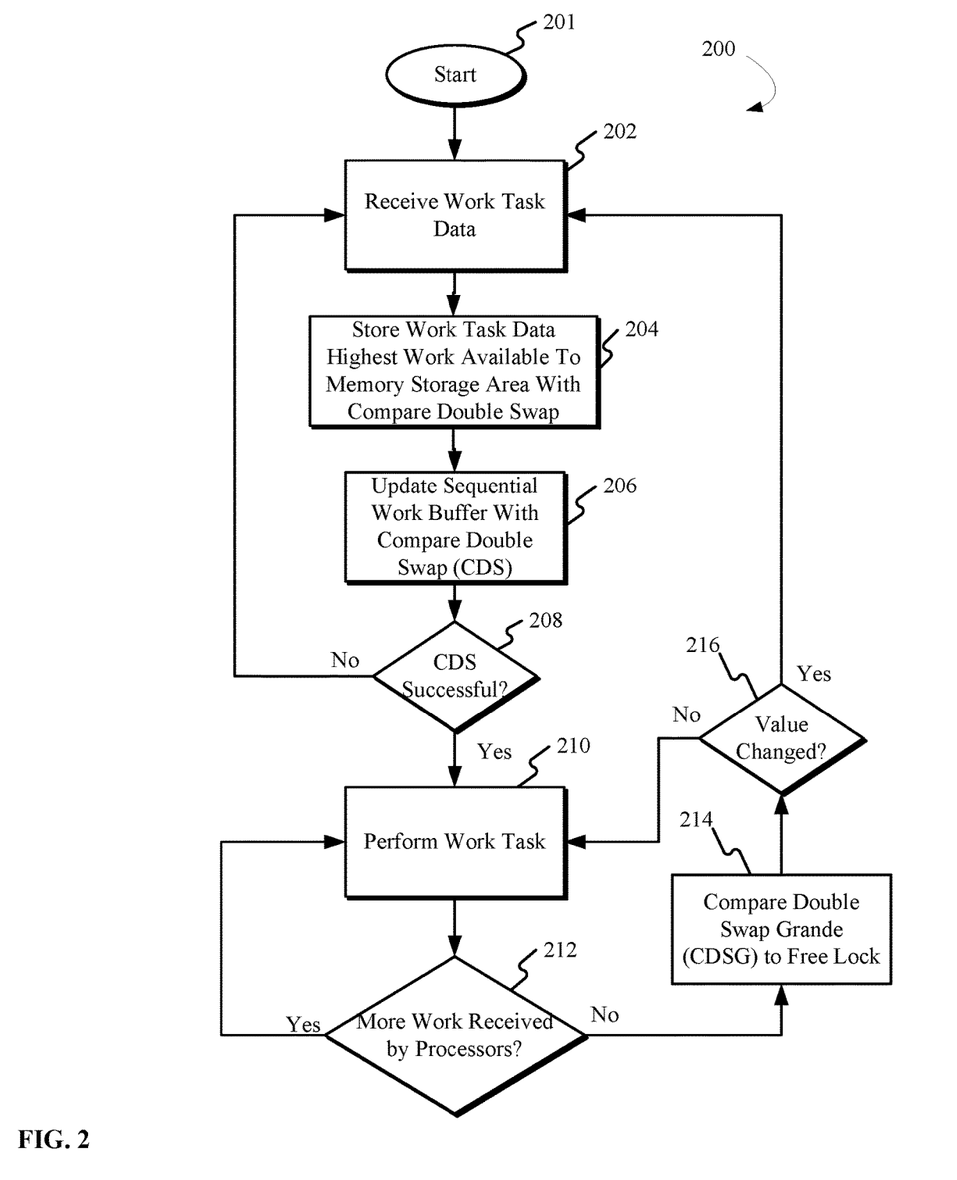
FIG. 2 depicts a flow diagram of multiple processor management using control double swap (CDS) and control double swap grande (CDSG) instructions according to one embodiment.
Figure 3:
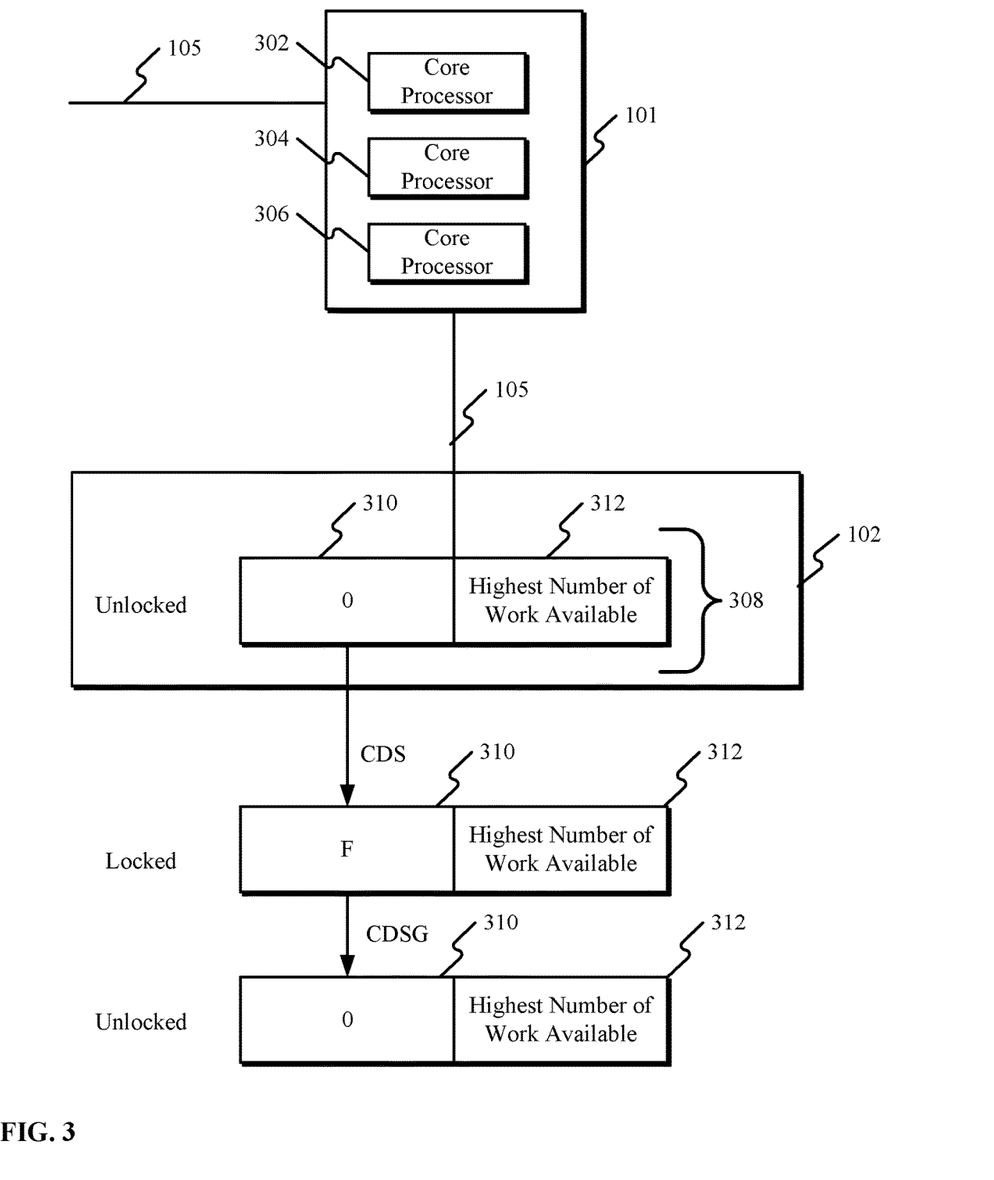
FIG. 3 depicts a processor 101 and memory 102, according to one embodiment.

FIG. 2 depicts a flow diagram of multiple processor management using compare double swap (CDS) and compare double swap grande (CDSG) instructions, according to one embodiment. Referring now to FIG. 2, after an initial start step 201, processor 101 receives, from a data channel (e.g., bus 105), work task data that includes execution instructions. The execution instructions, when executed, cause the executing processor to perform the work task received by processor 101. Although computer 100 may include a plurality of processors (referred to collectively as processor 101), only one processor (the executing processor) can actually execute the work task at any given time. FIG. 3 depicts a detailed view of processor 101 and memory 102, according to one embodiment.

Referring briefly to FIG. 3, processor 101 includes a plurality of processors, e.g., core processor 302, core processor 304, and core processor 306. It is appreciated that although only three core processors are depicted, computer 100 may include any number of operatively connected core processors. Processors 101 receive work tasks (not shown) via data channels in bus 105. Processors 101 are connected to memory 102 via bus 105. Only one core processor can execute work tasks at a time, although all of core processors 302, 304, and 306, respectively, may function as the executing core processor. For example, core processor 306 may be the executing core processor, while core processors 302 and 304 are actively receiving new work tasks via data channels in bus 105, and processing the work tasks in preparation for execution by core processor 306 when that respective sequence number is next up for execution.

Memory 102 includes memory storage area 308. Memory storage area 308 can include an interlocked portion 310 and a second portion 312. Interlocked portion 310 is one half the size (in bytes) of memory storage area 308, and equal in size with second portion 312. Second portion 312 is also called the "lock area" due to its function as a locking/unlocking mechanism. In some embodiments, interlocked portion 310 and second portion 312 can be 4 bytes each. In other embodiments, portions 310 and 312 can be 8 bytes each or 16 bytes each, etc.

Second portion 312 may contain the information associated with work tasks being processed and executed. The information stored in second portion 312 may be, for example, a sequence number indicative of the particular work task being executed. Since work tasks may be received by processor 101 out of sequence, but must be executed in sequence, work tasks each have a relative number associated with them. In some embodiments, the highest number (e.g., the highest known work task in line for execution) is stored in second portion 312 and sequentially updated as work tasks are processed, placed in line for execution, and executed by the executing core processor. Thus, second portion 312 may receive updates from the executing core processor or other receiving processors that are indicative of the next highest number of work available for processing and execution. The executing processor (e.g., core processor 306) that is charged with executing work tasks is always looking in second portion 312 to determine whether the highest possible executable sequence number is correct. If everything was received in sequence, then the highest possible executable sequence number can be changed (advanced) by the executing processor or another core processor.

Now that the general architecture is established, referring again to FIG. 2, an overview of the management of multiple processors (e.g., core processors 302, 304, and 306) using compare double swap (CDS) instructions and compare double swap grande (CDSG) instructions is provided, according to one embodiment. Referring now to FIG. 2, after an initial start step 201, processor 101 may receive work task data from the data channels, as shown in block 202.

As shown in block 202, processor 101 saves the work task data to memory storage 102. As shown in block 204 any of receiving processors 302, 304, and 306 may process the data in preparation for sequential execution by indicating the highest work arrived needing processing by using a compare double and swap to change storage area 312. Only one processor can be the active processor performing the execution because all of the received work tasks must be executed sequentially. While the executing processor (in this example, core processor 306) is executing the next sequential task, the other processors may "process" other work associated with other sequence numbers by taking the 'NO' branch on process step 208 returning to process step 202.

In the example illustrated in FIG. 2 and FIG. 3, a "0" in interlocked portion 310 (depicted in FIG. 3) indicates an unlocked storage area. When a processor, such as core processor 306, processes the arrival of work to be done that requires serialized processing, and this work is the current highest work element that can be processed (as indicated in second portion 312), the receiving core processor 306 uses a CS or CSG operation to indicate the sequence for this work in second portion 312.

As shown in block 206, core processor 306 will perform a compare swap (CS) or a compare double swap (CDS) or a compare swap grande (CSG) operation to try to set the lock value in interlocked portion 310. Accordingly, core processor 306 may update the sequential work buffer with a compare-swap operation. This ensures that the non-executing processors (e.g., core processors 302 and 304) are aware that they may receive and process new work tasks but may not be the active executing processor. According to some embodiments, there are three levels of compare and swap used to process and execute work tasks.

A compare and swap operation works on a word (4 bytes) of data, a compare and double swap and a compare and swap grande operation works on double-word (8 bytes) data, and a compare and double swap grande works on quad-word (16 bytes) data. Accordingly, in some aspects processor 101 can use compare and swap (CS) for 4 bytes of data, compare and double swap (CDS) or compare and swap grande (CSG) for 8 bytes of data and compare and double swap grande (CDSG) for 16 bytes of data.

A compare and swap (CS) instruction is used in multithreading computing to achieve data synchronization. CS compares the contents of a memory location to a given value and, only if they are the same, modifies the contents of that memory location to a given new value. Processor 101 may do this as a single atomic operation. The atomicity guarantees that the new value is calculated based on up-to-date information; if the value had been updated by another thread (e.g., another receiving processor) in the meantime, the write would fail. The result of the operation must indicate whether it performed the substitution. This confirmation can be done either with a simple Boolean response (this variant is often called compare-and-set) saved in interlocked portion 310, or by returning the value read from the memory location (not the value written to it).

According to some embodiments, processor 101 may perform a compare and swap grande (CSG) operation to indicate outstanding work to be done. The CSG is used to obtain a lock to perform work. A compare double swap grande (CDSG) is used to free up the lock when the two earlier CSG functions are both covered by the CDSG operation. This enables a single operation to see that no new work came in and to free the block at the same time.

After storing the work task data to memory, core processor 306 will attempt to lock the first half of memory storage area 308 (second portion 310) by performing a compare and swap (CS) operation or a compare and swap grande (CSG) operation. Processor 306 may perform a CDS or CDSG operation to attempt to set the lock value to 0 stored in interlocked portion 310, also using the value for actual completed work number to compare to the most current value of Highest Number of Work Available in the combined memory storage area 308.

If the CDS or CDSG is successful, the lock is set to 0 and the Highest Number of Work Available will remain the same indicating all serialized work is done and core processor 306 can go back to looking for the arrival of new work.

If the CDS or CDSG is not successful, the lock value shown in interlocked portion 310 (depicted as "Locked" in FIG. 3) remains as non-zero value (e.g., "F"), and processor CP1 then knows that there is more to complete since the most current value of Highest Number of Work Available must not be equal to the actual completed work number. In this case, the executing core processor 306 continues to perform the serialized work to be done.

In decision block 208, if the CS or CDS or CSG operation is not successful (able to change the locked value), then another processor (e.g., core processor 302 or 304), is already processing the serialized work.

Next processor 306 may determine whether the lock was successful by changing the value saved in interlocked portion 310 from a zero to a non-zero value (e.g., F as depicted in FIG. 3). The non-zero value indicates that the processor making the comparison now has the ability to be the executing processor, then complete the work by determining whether the work is the highest number of work available. This step avoids the possibility that once the highest work available is completed, and at the instant that the executing processor 306 releases the lock, a non-executing processor (e.g., core processors 302 or 304) may be updating the register containing the new highest available work (second portion 312). This means that, without this safeguard, the executing core processor 306 may miss the register update, and release the lock without processing the newly available work to be performed.

As shown in decision block 212, if the lock was successful, core processor 306 can go on to do all of the sequential work available by executing work tasks until it appears that all of the next available work has been completed (which can be indicated by the actual completed work number and "Highest Number of Work Available appear equal). After completing the sequence number update, the receiving processor determines whether it may now operate as the executing processor that is able to complete the work by executing that memory portion.

As shown in block 214, responsive to determining that the current work task is the highest work available, in order to do the unlock, processor 306 performs a CDSG operation on the entire memory storage area 308, which includes the current number of the highest number available for processing in second portion 312.

As shown in decision block 216, core processor 306 determines whether the CDSG operation was successful. Thus, if some other processor (e.g., core processor 302 or 304) has changed the value stored in interlocked portion 312 (the highest number of work available), the value stored in interlocked portion 310 will not be changed back to zero because the entire memory storage area 308 is compared. Accordingly, the executing processor is now alerted to the fact that it must go back and perform that next available work (block 210) prior to attempting to release the lock with another CDSG operation.

Core processors 302, 304, etc., will also be doing these same functions at the same time as the executing core processor 306. This allows for all of processors 302, 304, and 306 to be simultaneously looking for new work arriving (by querying each other) and, if they are successful at getting the lock, performing the work that is required to be done serially without the possibility of missing a "work to be done" condition that can occur with multiple processors providing this work. An interlocked update instruction guarantees that any other processor that is attempting to do an interlocked instruction of that storage area (you don't know if you are accessing that storage area right before it was changed or right after it was changed). This instruction guarantees that only one processor can see and operate that memory area until the work is completed. By using the method of combining the use of the CS and CDS (or CSG and CDSG), the possibility of missing the execution of task block 210 and thus missing the execution of work that arrives is eliminated.

Figure 4:
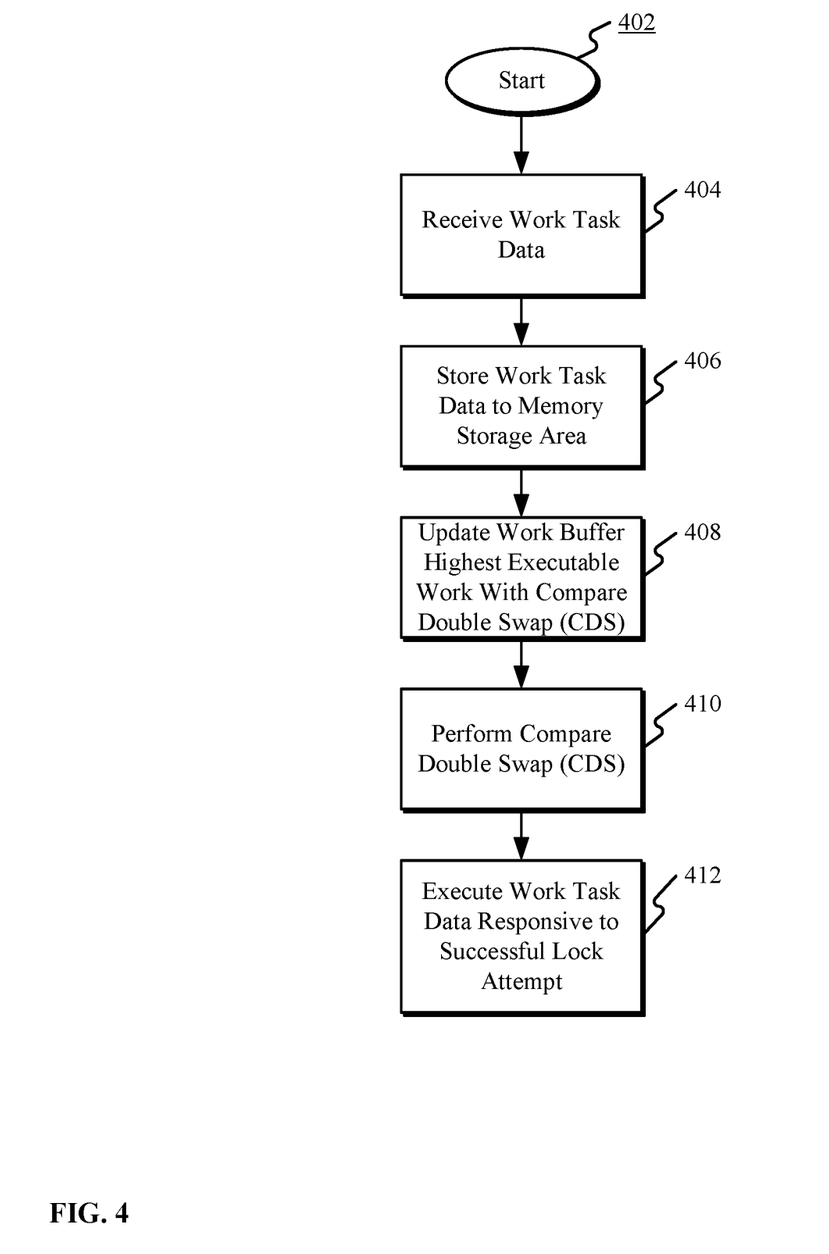
FIG. 4 depicts a flow diagram of a method for operating multiple processors according to one embodiment.

FIG. 4 depicts a flow diagram of a method for operating multiple processors, according to one embodiment. Referring now to FIG. 4, after an initial start step 402, processor 101 may receive, through an operatively connected data channel in bus 105, work task data, as shown in block 404. The work task data include execution instructions for executing the work task.

As shown in block 406, processor 101 may store the work task data to an operatively connected memory storage area (e.g., memory 102).

As shown in block 408, processor 101 may update a sequential work buffer (e.g., interlocked portion 312) indicative of whether the work task data is a highest current value in a plurality of sequential execution values. The highest current value in the sequential execution value is stored in second portion 312 of memory storage area 308 by using a compare and swap (CS) or a compare double and swap (CDS).

As shown in block 410, processor 101 may perform a compare double swap (CDS) lock attempt. In some embodiments, processor 101 may instead perform a compare and swap (CS) lock attempt. Performing the CDS lock attempt (or the CS lock attempt) includes performing a the lock attempt operation on the lock portion 310 of the memory storage area 308.

As shown in block 412, processor may next execute the work task data responsive to a successful lock attempt. Processor 101 may also determine whether a new work task is received by any operatively connected processor, and free the lock portion 310 and the second portion 312 based on the determination a compare double and swap (CDS) directed at memory storage area 308 comprised of both area 310 and 312. According to some embodiments, the interlocked portion 310 and the second portion 312 are freed with a compare double swap grande (CDSG) instruction.

Conventional multithread systems do not perform CS, CDS, and CDSG operations to lock the half area instructions that are interlocked along with the full area instruction that is interlocked in order to know whether or not there is more work to process. Presently disclosed embodiments increase system speed because instructions are not routed through a dispatcher to determine whether the work task is next in line for execution, and has not been duplicated or executed out of order. Embodiments described also guarantee that no new work is missed during the transitory period associated with releasing the lock.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for operating multiple processors comprising:
    receiving, via a processor operatively connected to a data channel, work task data comprising execution instructions;
    storing, via the processor, the work task data to an operatively connected memory storage area comprising an interlocked portion and a second portion configured as a locking and unlocking mechanism;
    updating a sequential work buffer indicative of whether the work task data is a highest current value in a plurality of sequential execution values;
    performing a compare double swap (CDS) lock attempt; and
    executing, via the processor, the work task data responsive to a successful lock attempt, wherein the second portion is configured to hold information indicative of a highest possible executable sequence number, wherein performing the CDS lock attempt comprises performing a CDS operation on both of the interlocked portion and the second portion of the memory storage area.

2. The computer-implemented method of claim 1, further comprising:
    determining whether a new work task is received by any of the processors operatively connected to the data channel; and
    freeing, via the processor, the interlocked portion and the second portion based on the determination.

3. The computer-implemented method of claim 1, wherein the interlocked portion and the second portion are freed with a compare double swap grande (CDSG) instruction.

4. The computer-implemented method of claim 1, wherein the memory storage area comprises 8 bytes of data, and the interlocked portion and the second portion of the memory storage area each comprise 4 bytes of data.

5. The computer-implemented method of claim 1, wherein the memory storage area comprises 16 bytes of data, and the interlocked portion and the second portion of the memory storage area each comprise 8 bytes of data.

6. A system for operating multiple processors comprising:
    a processor of a plurality of processors connected to a plurality of data channels, the processor configured to:
        receive work task data comprising execution instructions;
        store the work task data to an operatively connected memory storage area comprising an interlocked portion and a second portion configured as a locking and unlocking mechanism;
        update a sequential work buffer indicative of whether the work task data is a highest current value in a plurality of sequential execution values;
        perform a compare double swap (CDS) lock attempt; and
        execute the work task data responsive to a successful lock attempt, wherein the second portion is configured to hold information indicative of a highest possible executable sequence number, wherein the processor is configured to perform a CDS operation on both of the interlocked portion and the second portion of the memory storage area.

7. The system of claim 6, wherein the processor is further configured to:
    determine whether a new work task is received by any processor of the plurality of processors connected to the data channel; and
    free the interlocked portion and the second portion based on the determination.

8. The system of claim 6, wherein the processor is configured to free the interlocked portion and the second portion with a compare double swap grande (CDSG) instruction.

9. The system of claim 6, wherein the memory storage area comprises 8 bytes of data, and the interlocked portion and the second portion of the memory storage area each comprise 4 bytes of data.

10. The system of claim 6, wherein the memory storage area comprises 16 bytes of data, and the interlocked portion and the second portion of the memory storage area each comprise 8 bytes of data.

11. A computer program product for operating multiple processors, the computer program product comprising a computer readable storage medium having program instructions embodied therewith, the program instructions executable by a processor to cause the processor to perform a method comprising:
    receiving, via a processor operatively connected to a data channel, work task data comprising execution instructions;
    storing, via the processor, the work task data to an operatively connected memory storage area comprising an interlocked portion and a second portion configured as a locking and unlocking mechanism;
    updating a sequential work buffer indicative of whether the work task data is a highest current value in a plurality of sequential execution values;
    performing a compare double swap (CDS) lock attempt; and
    executing, via the processor, the work task data responsive to a successful lock attempt, wherein the second portion is configured to hold information indicative of a highest possible executable sequence number, wherein performing the CDS lock attempt comprises performing a CDS operation on both of the interlocked portion and the second portion of the memory storage area.

12. The computer program product of claim 11, further comprising:
   determining whether a new work task is received by the any processor operatively connected to the data channel; and
   freeing, via the processor, the interlocked portion and the second portion based on the determination.

13. The computer program product of claim 11, wherein the interlocked portion and the second portion are freed with a compare double swap grande (CDSG) instruction.

14. The computer program product of claim 11, wherein the memory storage area comprises 8 bytes of data, and the interlocked portion and the second portion of the memory storage area each comprise 4 bytes of data.

* * * * *